April 4, 1961 B. M. LANG 2,977,836
MUSIC INSTRUCTION DEVICE
Filed Dec. 26, 1957 2 Sheets-Sheet 2
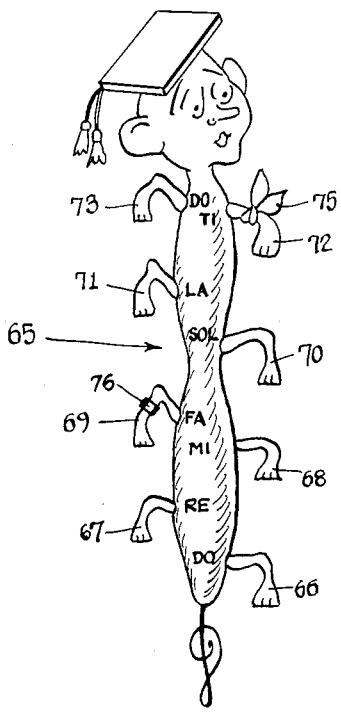
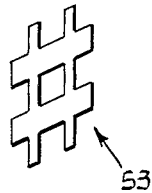
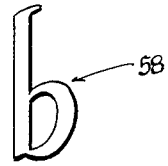
INVENTOR.
Boris M. Lang
BY
AGENT United States Patent Office
2,977,836
Patented Apr. 4, 1961

2,977,836

MUSIC INSTRUCTION DEVICE

Boris M. Lang, 142 Garth Road, Scarsdale, N.Y.

Filed Dec. 26, 1957, Ser. No. 705,205

5 Claims. (Cl. 84—471)

This invention relates to the instruction of music, and more particularly to devices which help in obtaining an understanding of music.

One object of the invention is to provide a novel and improved instruction aid for music by which there is facilitated a comprehension of such concepts as the relationships of musical notes and keys, especially in connection with the piano and writing methods of our musical notation.

Another object of the invention is to provide a novel instruction aid as above set forth, wherein manual operations, as in a game device, are utilized in obtaining the understanding of the musical concepts.

A further object of the invention is to provide an instruction aid for music in accordance with the foregoing, wherein the simpler musical keys are first learned, and thereafter advance is made to those keys involving additional sharps and flats, which logically follow the first-learned keys.

Still another object of the invention is to provide a novel music instruction aid intended to facilitate an understanding of the different musical keys, wherein by a simple and interesting manual operation or procedure the more complex keys, i.e., those involving a great number of sharps or flats, may be developed and understood by using a "preceding" or simpler key to determine the signature or number of sharps or flats of a "succeeding" key having an additional sharp or flat.

A further object of the invention is to provide an improved music instruction aid wherein the development of keys based on the perfect fifth interval of the scale is graphically illustrated in a simple manner, together with the required changes in the key signature.

A feature of the invention resides in the provision of a novel and classic association of piano keyboard, geometric figures, chromatic color sequences of sun spectrum, a stair or ladder, fixing the C major scale relationships of tones, and of the staff's lines and spaces. This has made possible a rational and graphic understanding of music by the acceptance of a unit of measurement (a half a step) revealing what was heretofore an unintelligible and enigmatic "between the lines" concept that only an experienced musician was able to decipher.

An additional object of the invention is to provide an improved musical instruction aid which graphically or pictorially interprets for the student the relationship of the musical tones and keys, as they are created and recorded on the staff as clusters of sharps or flats.

A feature of the invention resides in the provision of a musical instruction aid which graphically, clearly distinguishes the sharps and flats from the natural tones, on a representation of a familiar structural object which is associated with the piano keyboard and with the musical staff.

Another feature of the invention resides in the provision of an improved musical instruction aid as above set forth, which is extremely simple in its construction, and which employs relatively few parts which are adapted to be simply fabricated.

A further object of the invention is to provide a novel and simplified instruction aid for music, having all of the above features and advantages and which is nevertheless economical to fabricate, lending itself to regular mass production techniques.

Other features and advantages will hereinafter appear.

In the drawings accompanying this specification, similar characters of reference indicate corresponding parts wherever possible throughout the several views, in which:

Fig. 2 is a top plan view of a movable piece adapted to be used with the board of Fig. 1, for the purpose of indicating and developing the musical scales.

Fig. 3 is a top plan view of a movable piece somewhat different from that shown in Fig. 2, but adapted for the same purpose.

Fig. 4 is a plan view of a movable piece representing the mark known as a "sharp," in music.

Fig. 5 is a top plan view of a movable piece representing the mark which is known as a 'flat," in music.

Fig. 6 is a top plan view of a movable piece adapted for use with the chart of Fig. 1, and adapted to function as a rung of the ladder shown in Fig. 1.

Figure 1:
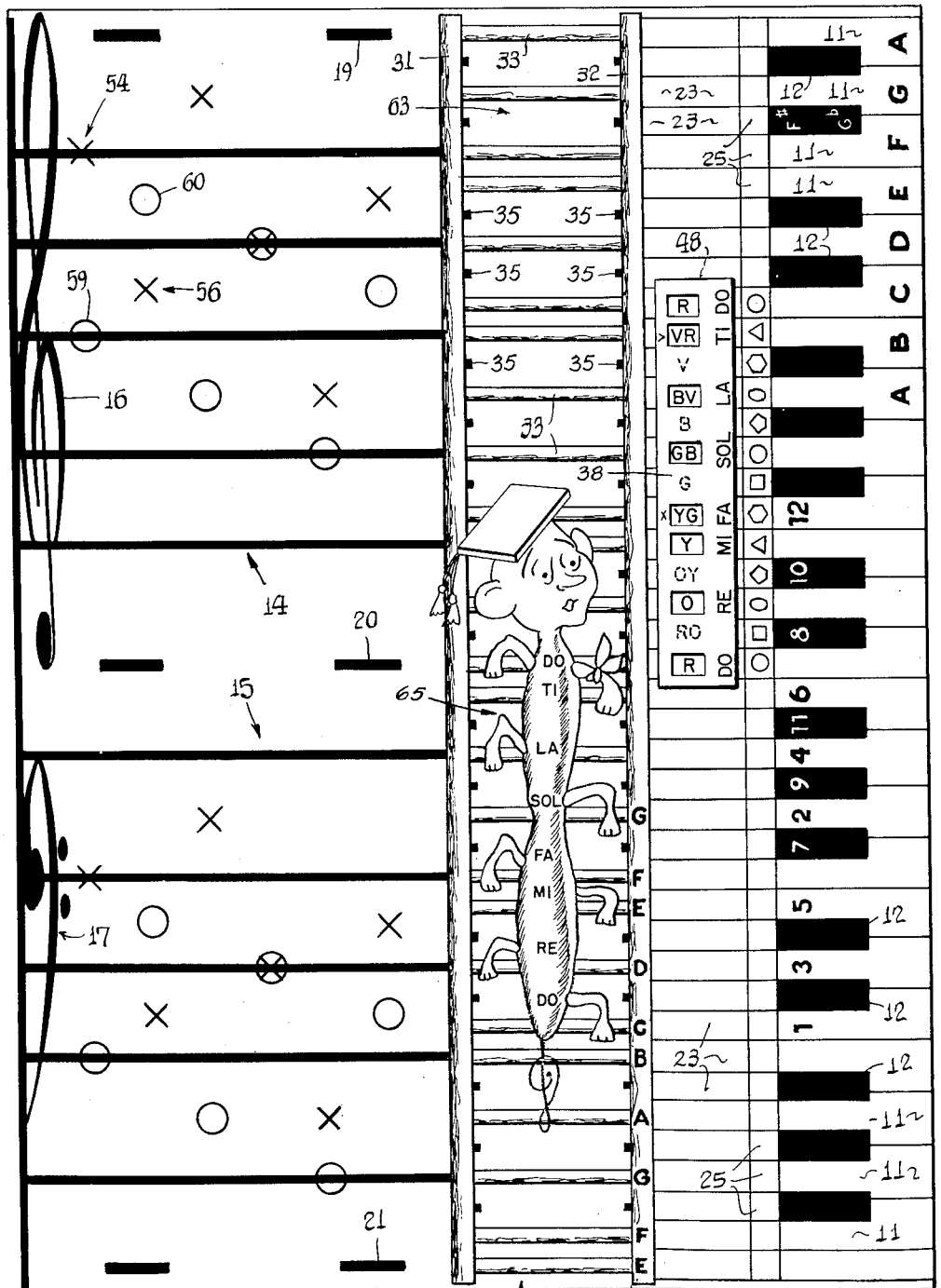
Figure 1 is a plan view of a board or chart having designations thereon representing one embodiment of the invention, showing in superimposed relation therewith the movable piece of Fig. 2 and the movable piece of Fig. 3.

Considering first Fig. 1, I provide in accordance with the present invention a novel chart or printed board, indicated by the numeral 10, which has various indicia and representations by which a unique and graphic analogy is had between the piano keyboard, the musical staffs on which music is commonly written, and a familiar structural device which in most cases is preferably well known to the student or person who is to avail himself or herself of the instruction aid.

Along the right marginal portion of the board or chart 10 there are provided designations indicated at 11 and 12, representing the white and black keys of a portion of the piano keyboard. Starting with the note "E" represented by the first ledger line below the bass staff, the piano keyboard representation continues up the scales to the note "A" represented by the first ledger line above the treble staff. A total of three octaves and six additional notes or tones beyond the third octave is represented, starting with the lowermost note "E." In other words, the representation of the portion of the piano keyboard includes a final or upper octave based on "A" of the natural octave.

In conjunction with the designations 11 and 12 representing the portion of the piano keyboard, I also provide on the board or chart 10 a corresponding staff structure, comprising a treble staff 14 and a bass staff 15, including a treble clef 16 and a bass clef 17. Associated with the staffs 14 and 15 are short ledger lines 19, 20, and 21 located above, below, and between the treble and bass staffs 14 and 15.

It will be noted that the staffs 14 and 15 are disposed so that the lines thereof are in alignment with certain white keys 11 of the piano keyboard representation, which may be thought of as corresponding to said lines. As is well known, all staff lines may be thought of as indicating certain white keys and also all spaces between the staff lines may be thought of as indicating certain other white keys. The lines and spaces may also be used to indicate black piano keys depending on the particular sharped or flatted note designations which are placed thereon. However, barring the use of sharps or flats, the staff lines and the spaces between the lines may be thought of as relating to white keys on the piano keyboard, and it will be seen that the staff lines are accordingly arranged in alignment with corresponding white piano keys on the chart 10.

Associated with the designations 11 and 12 representing the piano keyboard, and with the treble and bass staffs 14 and 15 there is also provided what has been termed a "rainbow" system of colors, by which each tone included in an octave, taking also the flatted and sharped notes, is given a distinctive color. In effecting this, I provide a column of rectangular or oblong areas 23, disposed between the keyboard representation and the staffs 14 and 15. The rectangular areas 23 are preferably colored as follows, starting with the note "C" and ending with the next higher octave note "C," and including all of the white and black piano keys: Red, red-orange, orange, orange-yellow, yellow, yellow-green, green, green-blue, blue, blue-violet, violet, violet-red and red. This color scheme is repeated for each other octave on the piano keyboard, starting with the note "C" and ending with another note "C" displaced from the first by an octave. Colors may also be given to the sharps and flats as follows:

F sharp—green
C sharp—red-orange
G sharp—blue
D sharp—orange-yellow
A sharp—violet
E sharp—yellow-green
B flat—violet
E flat—orange-yellow
A flat—blue
D flat—red-orange
G flat—green
C flat—violet-red I further provide a number of different geometric figures or patterns, which are associated with the designations representing the piano keys. Between the column of rectangles 23 and the designations representing the keyboard I provide a column of squares 25, in which the following geometric figures are placed, each being related to a particular note or piano key as shown. First there is a circle, then a square, then an oval, a pentagon, a triangle, a hexagon and so on as shown. It will be noted that, considering the geometric figures and starting with the note "C," if the 2nd, 4th and so on (alternate) figures are omitted, there will be a sequence of a circle, an oval, a triangle, a square, a pentagon and a hexagon. Two such sequences are intermingled, one starting on "C" (red color) and the other starting on "G" (green-blue color). The above colors and geometric figures, by use of the arrangement shown, are a help in recognizing the sequence of the scales, sharps and flats.

In accordance with the present invention, in conjunction with the designations 11 and 12 representing the piano keyboard and the staffs 14 and 15, I provide representation of a familiar object which I have discovered to be useful in enabling the relationships between the various musical notes and the various musical keys to be readily grasped and understood. In the embodiment of the invention illustrated in Fig. 1 such representation is of a ladder, the said representation having basic marks comprising selectively placed rungs some of which are close together and others of which are spaced further apart. As shown, such representation, indicated by the numeral 30, is preferably disposed between the column of rectangular areas 23 and the treble and bass staffs 14 and 15. The representation 30 of the ladder may have any suitable type of side rails 31 and 32, and may have a plurality of full rungs 33 extending between the side rails 31 and 32. As shown, the rungs 33 are aligned with those notes of the keyboard representation which make up the key of C, namely C, D, E, F, G, A, B and C. Also, those full rungs of the ladder which are aligned with adjoining white keys of the piano keyboard are shown as spaced closer together than the remaining full ladder rungs. Thus, the rungs corresponding to the white keys "B," "C" and "E," "F" are spaced closely together whereas the other rungs are spaced more widely apart. This particular pattern is followed throughout the entire range of the keyboard, as illustrated. Moreover, in conjunction with the side rails 31 and 32 and the rungs 33 I provide other designations or marks, referred to the piano keyboard. Such other marks are indicated at 35, and may be short or small black dots representing other incomplete rungs projecting inwardly from the side rails, the said dots being in alignment with the black piano keys, as indicated. The designations 35 may be dots on the rails, or notches in the rails, etc.

Also, in accordance with the invention, in conjunction with the showing 30 of the ladder I provide a movable piece or member which is elongate and which has a plurality of indicia having characteristics similar to each other all except for two, such indicia being disposed longitudinally of the piece the same as the ladder rungs representing the octave from "C" to "C." For example, as shown in Fig. 2, the movable piece may be in the form of a rectangular member 38 of cardboard, plastic or any other suitable material, such member having a plurality of openings 39–46 constituting the said indicia and disposed longitudinally thereof and spaced similarly to the rungs of the ladder corresponding to the notes "C," "C" of the octave of the key of C. The openings 39–46 are also referred to in the claims as representative of the degrees of the scale. The member 38 is preferably of a size such that it may be placed on the chart 10, as for example over the column 23 of rectangular spaces, as shown in Fig. 1. When so placed, the cutout 39 will correspond to the middle "C" note of the piano, the cutout 40 to the next "D" note, the cutout 41 to "E," the cutout 42 to "F," etc. It will be seen that the cutouts 41, 42 and the cutouts 45, 46 are closely spaced, as are the rungs 33 which correspond to the notes "E" and "F," and "B" and "C" of the octave based on the scale of C.

The cutouts 39–46 may all be alike, except that it is preferred to make the cutouts 42 and 45 somewhat different from the others, for a purpose now to be disclosed. For example, the cutouts 42 and 45 may be differentiated by the provision of check marks 49 and 50 is indicated in Fig. 2. There may also be advantageously provided on the piece 38 the names of the notes of the scale, for example, "do," "re," "mi," "fa," "sol," "la," "ti," "do." The cutout 42 would correspond to the scale tone "fa," representing the fourth degree, and the cutout 45 would correspond to the scale tone named "ti" representing the 7th degree, traveling up from the beginning tone "do."

I have found that such 4th and 7th interval tones or degrees have significance in developing the various musical keys, starting for example with the key of C and going to the key of G based on the fifth degree of the C scale, the key of D based on the fifth degree or tone of the G scale, the key of A based on the fifth tone of the D scale, or going from the key of C to the key of F based on the fourth degree of the C scale, the key of B flat based on the fourth degree of the F scale, etc.

In the first instance, a sharp must be added to the key signature, and the sharp note is always the 7th degree of the scale, corresponding to the tone known as "ti" and the cutout 45. Thus, when the piece 38 is placed on the chart 10 so that the cutout 39 corresponds to the note "G," the cutout 45 will not correspond to the note "F," and such note must be changed to a sharp in preserving the pattern of the scale based on the note "G." In the same manner, when the piece 38 is placed on the chart 10 so that the cutout 39 corresponds to the note "D," the cutout 45 will not correspond to the note "C," which now must be sharped in order to maintain the pattern of the scale, based on the note "D."

In the second instance, involving the development of the keys having flats in the signature, it will be seen that one flat must be added each time to develop the next key, and that the flatted note or degree is always the 4th degree of the scale, corresponding to the tone known as "fa."

Thus, in accordance with the invention, the student may proceed to develop the various musical scales. When working with sharps, proceeding from the natural scale of the key of C the student will place the piece 38 on the chart with the cutout 39 at the fifth degree "G," and will thereupon be apprised of the fact that the 7th degree, not corresponding to the cutout 45 must be altered and made a sharp. This note or degree would then become "F" sharp, and the student could thereupon place a piece having the outline of a sharp, as for example the piece 53 in Fig. 4, on the staff line for the note "F." In Fig. 1 such staff line has an "X" or cross indicated on it at 54, where the piece 53 may be placed. Thereupon, the student would proceed, now placing the piece 38 on the note "D" whereupon the cutout 45 will not fall on the note "C," indicating that such note should also be altered and made a sharp. The student will then place another piece similar to that shown at 53 in Fig. 4, this time on the space of the treble staff corresponding to the note "C." A cross indicated at 56 in such space would be a suitable place for putting the sharp designation referred to. In a like manner, the musical keys of A, E, etc., may be developed, together with the proper signatures thereof. As the key of F sharp is reached, the student will know that this is also like the key of G flat, and in place of the sharps required in the signature for the key of F sharp, six flats may be utilized making up the signature for the key of G flat.

In Fig. 5 a piece 58 is shown in the form of a flat, which may be placed at the proper lines and spaces on the staffs, as indicated by the circles. For example, considering the treble staff, the key of F having in its signature B flat, will be designated by placing the piece 58 where the circle 59 is located, in Fig. 1. For the key of B flat, a second piece 58 will be placed at the circle 60 shown in the treble staff of Fig. 1. It will be understood, however that the progression or development of the musical keys which involve flatted notes and alteration of the 7th degree may proceed after the development of the keys involving the sharped notes, and that the student will begin with the key of G flat, having six flats, to the key of D flat, having five flats, thence to the key of A flat, with four flats, then the key of E flat having three flats, the key of B flat having two flats, then the key of F having one flat, finally returning to the key of C which has neither flats nor sharps. Thus the device can work from one sharp to one flat with the "ti" designation requiring raising half a step, which means sharping up the Six Sharps, but making the 7th Natural from six flats to no flats (6 flats, 5, 4, 3, 2, 1, 0).

Whereas the progression of keys involving more sharps necessitates a use of more rungs on the ladder, adding sharps, the progression of keys from many flats to few flats requires a gradual removing of rungs. The rungs are preferably in color, having the same hue as the sharps, flats, geometric figures and colored lines or areas. Also, the sharps and flats may be slidably mounted or superimposed, or may be rotatably mounted to enable them to be properly related to the clefs, in the desired clusters.

When developing the keys involving flats, starting from the key of C and adding one flat at a time, the student will place the piece 38 on the chart 10 so that the cutout 39 corresponds to the note F. The cutout 42, for the tone "fa," will now not correspond to the piano note B, and such note must therefore be changed to a flat, B flat, which does correspond with the cutout 42. Thus, the student has visually indicated to him that the note B must be flatted, to preserve the pattern of the scale based on the note F. In a like manner, placing the piece 38 so the cutout 39 corresponds with B flat will show that the cutout 42 does not correspond to E natural but instead to E flat. Thus, it is again indicated that another flat must be added, to preserve the pattern of the key of B flat. The key of E flat and A flat are likewise developed, each time by flatting the 4th degree (the cutout 42).

In conjunction with the placement of the sharp figures 53 and the flat figures 58, I also provide pieces 62 which are of straight outline, similar to the rungs 33. A piece 62 may be placed on the ladder 30 to represent either a sharp or a flat. For example, when considering the key of G, the piece 62 may be placed at the location indicated at 63 in Fig. 1, thereby to represent the note of F sharp. Other pieces 62 may thereafter be placed at appropriate places on the ladder 30 to represent the various sharps and flats, as the musical keys are developed. The pieces 38, 53, and 62 may utilize magnetism to hold them in position. The pieces may also be of flexible plastic such as vinyl plastic, electrostatically charged or otherwise having a tendency to stick to a smooth surface until removed by a forceful pull; or other electrical or mechanical means and parts serving the same purpose may be utilized.

It will now be understood that in accordance with this invention there is provided a unique, musical instruction aid by which, through a graphical method involving manipulative operations, the student may develop the various musical keys and relate them to the piano keyboard and to the staffs as found in written music. The relationships of the tones of the scale octaves, and the relationships of the various keys will be vividly brought home, and may be readily understood. The procedure by which sharps are added, and later by which flats are removed to develop one musical key after another readily fixes the keys in the mind of the student. Moreover, the procedure involved becomes quite interesting and is in the nature of a game whereby the concepts are readily understood and retained.

The piece 38 may have printed indicia instead of cutouts or perforations. In place of the piece 38 shown in Fig. 2, a piece 65 illustrated in Fig. 3 may be employed in conjunction with the representation of the ladder as shown in Fig. 1. The piece 65 is in the form of an animate object such as a beetle or bug, having a plurality of feet 66, 67, 68, 69, 70, 71, 72, and 73 corresponding to the cutouts 39—46 in the piece 38. The foot 72 corresponds to the cutout 45 representing the 7th tone of the scale, and to distinguish this from the other tones, the foot 72 may be appropriately marked, as by the provision of a bandage 75 or other distinguishing characteristic.

It will be noted that the piece 65 may be placed directly on the ladder 30, just as the piece 38 was placed on the row of rectangular spaces 23. The feet 66–73 may be made to contact the rungs corresponding to the octave from middle "C" to the "C" above the same. When the piece 65 is placed on the ladder so that the lowermost foot 66 is on the rung corresponding to the note G, the foot 67 will rest on the rung corresponding to the note A, and so on, and the foot 72 will find no rung to stand on, corresponding to the note "F," indicating that the existing rung F, not needed for the "ti" foot of the piece 65, *must be raised half a step*, which corresponds to raising of the note F, by a sharp, to F♯. That is, the F note must be changed to a sharp, in order to maintain the tones of the scale. It may be considered that the lack of a rung caused the climbing figure to slip and sprain his foot, hence the bandage 75 on the foot 72. The student "helps" the climbing object and places the additional rung in place, "raising" the existing note by half a step, which means making either a sharp from a natural note or a natural note from a flatted note.

As seen in Fig. 3, the indicia or foot 69 corresponding to the tone "fa" may be characterized by a special designation as for example a band 76, such foot indicating where the flat must be added, as the keys F, B flat, E flat etc. are developed. As the figure 65 is placed on the ladder in developing the keys having flats, the foot 69 will find no rung to stand on, just as the foot 72 found no rung is developing the keys having sharps. Thus, there is indicated to the student that a flat is to be used, in conjunction with the foot 69.

In place of the major scale, the minor scale may also be used, and the templet of the animate object to go with the minor scale would have feet spaced as in the minor key, viz. A, B, C, D, E, F, G sharp and A.

It will be understood from the foregoing that I have provided a novel and improved, unique musical instruction aid which graphically assists the student in obtaining a thorough understanding and comprehension of the relationships of the various tones of the scales and keys of the piano keyboard, and of the related musical scales, especially in connection with the piano keyboard and the staffs on which music is written. The device of this invention is seen to be extremely simple, economical to produce, and creates an interest in the student which facilitates the learning process. By the provision of the manipulative steps, the student's interest is held and the learning process is made more interesting.

The principle of the invention lies in the fact that the ladder, and the lines and spaces of the staff do not just account for the sharps and flats. The whole layout is scaled to provide a graphic presentation of half steps. When there are to be sharps or flats, the rung which is supplied by the student, expressed also as a sharp or flat on the staff by colored symbols of a sharp and flat, makes the young mind understand the essence of discrepancy between the shown staff and its hidden items, which must be *thought out*. Accordingly, *the pattern of the scale, when it is repositioned and superimposed on its own fifth degree, systematically discloses the item, not provided with a place of its own, on the staff*. The novelty of the figure 65 is in the dramatic and active application of the *ratio* of the scale degrees to the ladder (which is all white keys), and relation to this action to the staff. The latter is in some places distorted to represent the graphic scaling of all actions to the semitone interval. Thus nothing must be thought here, but all is seen and enacted.

Variations and modifications may be made within the scope to the claims, and portions of the improvements may be used without others.

I claim:

1. A music instruction device comprising in combination, a board-like member having designations thereon representing a portion of a piano keyboard and the white and black piano keys thereof, and having other designations representing staffs with bass and treble clefs and staff lines above and below said staffs, said staffs and lines being aligned with the corresponding piano key designations of the said keyboard portion; a representation of a ladder on said board-like member having rungs aligned with those notes of the keyboard representation which make up the scale of the key of C, the rungs of the ladder which are aligned with adjoining white keys being spaced closer together than the remaining ladder rungs, and an elongated movable piece having a plurality of alternately staggered indicia suggestive of feet extending laterally thereof, and said piece is adapted to be positioned on said ladder so that said indicia are positioned in alternate staggered relation to the rungs.

2. The invention as defined in claim 1, wherein said elongated movable piece has a configuration suggestive of an animate object and the plurality of indicia suggestive of feet are disposed longitudinally thereof and spaced apart the same as the ladder rungs representing the octave from "C" to "C," the indicia corresponding to the "B" rung being different from the remainder of the indicia.

3. The invention as defined in claim 1, wherein said elongated movable piece has a configuration suggestive of an animate object and the plurality of indicia suggestive of feet are disposed longitudinally thereof and spaced apart the same as the ladder rungs representing the octave from "C" to "C," the indicia corresponding to the "F" rung being different from the remainder of the indicia.

4. The invention as defined in claim 1, wherein said elongated movable piece has a configuration suggestive of an animate object and the plurality of indicia suggestive of feet are disposed longitudinally thereof and spaced apart the same as the ladder rungs representing the octave from "C" to "C," the indicia corresponding to the "B" and "F" rungs being different from the remainder of the indicia.

5. The invention as defined in claim 1 in which the representation of the climbing-type structure includes other marks in the form of cut-off treads aligned with designations representing black keys of the said portion of the piano keyboard.

References Cited in the file of this patent

UNITED STATES PATENTS

| | | |
|---|---|---|
| 323,196 | Neill | July 28, 1885 |
| 367,156 | Nix | July 26, 1887 |
| 632,137 | Morriss | Aug. 29, 1899 |
| 718,065 | Woods | Jan. 6, 1903 |
| 727,846 | Sanford | May 12, 1903 |
| 1,295,025 | Gray | Feb. 18, 1919 |

FOREIGN PATENTS

| | | |
|---|---|---|
| 16,032 | Denmark | May 23, 1912 |
| 950,607 | France | Mar. 28, 1949 |